(12) United States Patent
Graichen et al.

(10) Patent No.: US 10,781,828 B2
(45) Date of Patent: Sep. 22, 2020

(54) CENTRIFUGAL PUMP WITH NOISE DAMPENING RUBBER ISOLATION IMPELLER BUSHING

(71) Applicant: Hanon Systems, Daejeon (KR)

(72) Inventors: Brian Graichen, Leonard, MI (US); David Crowther, Bloomfield Hills, MI (US); Jean-Claude Cadoret, Redford, MI (US)

(73) Assignee: HANON SYSTEMS, Daejeon (KR)

( * ) Notice: Subject to any disclaimer, the term of this patent is extended or adjusted under 35 U.S.C. 154(b) by 105 days.

(21) Appl. No.: 16/128,611

(22) Filed: Sep. 12, 2018

(65) Prior Publication Data

US 2020/0080571 A1   Mar. 12, 2020

(51) Int. Cl.
*F04D 29/66*   (2006.01)
*F04D 1/00*   (2006.01)
(Continued)

(52) U.S. Cl.
CPC ............. *F04D 29/669* (2013.01); *F04D 1/00* (2013.01); *F04D 13/026* (2013.01); *F04D 13/0633* (2013.01); *F04D 29/026* (2013.01); *F04D 29/04* (2013.01); *F04D 29/046* (2013.01); *F04D 29/047* (2013.01); *F04D 29/0413* (2013.01); *F04D 29/0473* (2013.01); *F04D 29/056* (2013.01); *F04D 29/057* (2013.01); *F04D 29/0513* (2013.01); *B60Y 2200/91* (2013.01)

(58) Field of Classification Search
CPC ...... F04D 1/00; F04D 13/026; F04D 13/0633; F04D 29/04; F04D 29/0413; F04D 29/046; F04D 29/047; F04D 29/0473; F04D 29/0513; F04D 29/056; F04D 29/057; A61M 1/1013; A61M 1/10; A61M 2206/20; A61M 1/122; A61M 1/101
See application file for complete search history.

(56) References Cited

U.S. PATENT DOCUMENTS 3,853,429 A * 12/1974 Wiedenmann ....... A01K 63/047
                                                            417/356
3,938,914 A *  2/1976 Zimmermann ....... F04D 13/026
                                                            417/420
(Continued)

FOREIGN PATENT DOCUMENTS

JP          H02257920 A     10/1990
JP          H05001899 U      1/1993
(Continued)

*Primary Examiner* — Justin D Seabe
*Assistant Examiner* — Andrew J Marien
(74) *Attorney, Agent, or Firm* — Shumaker, Loop & Kendrick, LLP; James D. Miller

(57) ABSTRACT

A rotary assembly for a centrifugal pump includes a housing, an impeller, a first opening formed in one of the housing or the impeller, a first bushing disposed in the first opening, and a first shaft projection projecting axially from one of the housing or the impeller. The first bushing extends annularly around a central opening thereof and is formed from an elastomeric material. The first shaft projection is received within the central opening of the first bushing. One of the first shaft projection or the first bushing is configured to rotate relative to the other of the first shaft projection or the first bushing during operation of the centrifugal pump.

17 Claims, 6 Drawing Sheets

(51) Int. Cl.
*F04D 29/02* (2006.01)
*F04D 29/046* (2006.01)
*F04D 29/041* (2006.01)
*F04D 13/06* (2006.01)
*F04D 13/02* (2006.01)
*F04D 29/047* (2006.01)
*F04D 29/051* (2006.01)
*F04D 29/057* (2006.01)
*F04D 29/056* (2006.01)
*F04D 29/04* (2006.01)

(56) References Cited

U.S. PATENT DOCUMENTS

| | | | | |
|---|---|---|---|---|
| 4,016,893 A * | 4/1977 | Scott | ................ | B08B 3/006 |
| | | | | 134/115 R |
| 4,363,631 A * | 12/1982 | Wloka | ................ | F04D 29/0413 |
| | | | | 464/181 |
| 5,224,823 A * | 7/1993 | Cordts | ................ | F04D 1/00 |
| | | | | 415/203 |
| 2004/0081554 A1 * | 4/2004 | Bruce | ................ | F01D 17/162 |
| | | | | 415/160 |
| 2005/0276686 A1 * | 12/2005 | Bruce | ................ | F01D 17/162 |
| | | | | 415/160 |
| 2018/0274320 A1 * | 9/2018 | Cardona Aguirre | ... | H01B 17/30 |
| 2020/0032808 A1 * | 1/2020 | Pae | ................ | F04D 13/06 |

FOREIGN PATENT DOCUMENTS

| | | |
|---|---|---|
| JP | H0925890 A | 1/1997 |
| JP | H109276 A | 1/1998 |
| JP | H10205492 A | 8/1998 |
| JP | 2013147216 A | 8/2013 |
| JP | 2017099255 A | 6/2017 |
| KR | 100473411 B1 | 9/2005 |
| KR | 20180054954 A | 5/2018 |

* cited by examiner

FIG. 1 - PRIOR ART

CENTRIFUGAL PUMP WITH NOISE DAMPENING RUBBER ISOLATION IMPELLER BUSHING

FIELD OF THE INVENTION

The invention relates to a centrifugal pump, and more specifically to a rotary assembly including a shaft rotatably disposed within a bushing configured to dampen vibrations generated between the shaft and the bushing during relative rotation therebetween.

BACKGROUND OF THE INVENTION

The operation of an electric motor of an electric vehicle tends to produce less noise that is audible to a passenger of the electric vehicle than does a traditional combustion engine. As a result, the passenger of the electric vehicle may become aware of the sounds generated by various components of the electric vehicle that are otherwise not audible during operation of the traditional combustion engine. Such sounds may be annoying or even disconcerting to a passenger of the electric vehicle, as the passenger may believe that the unexpected sound is an indication of a component being inoperable or in need of repair. Accordingly, as the electric vehicle becomes more prevalent, there is an increasing demand for vehicle components that generate a minimal amount of noise, vibration, and harshness (NVH) that can be detected by the passenger in the passenger compartment of the electric vehicle.

One such component in need of NVH reduction is a centrifugal pump used to transport a fluid along a flow path of an associated fluid system of the electric vehicle, such as transporting a liquid coolant through a cooling system of the electric vehicle. The centrifugal pump operates by converting the rotational kinetic energy of an impeller of the centrifugal pump to the hydrodynamic energy of the fluid flow passing through the centrifugal pump. Such centrifugal pumps normally operate by driving a rotor acting as the impeller to rotate relative to a stationary housing having a stator. The operation of such a centrifugal pump accordingly leads to an incidence of sliding contact present between the stationary housing and the rotating rotor, wherein such sliding contact may lead to the generation of NVH or the transferal of existing NVH between the stationary housing and the rotor.

For example, FIG. 1 illustrates a centrifugal pump 100 according to the prior art. The centrifugal pump 100 includes a housing 102, a stationary shaft 104 securely coupled to the housing 102 at each end thereof, and an impeller 106 configured to rotate about the shaft 104. The stationary shaft 104 is typically formed from a rigid material such as steel. The rigid material may be hardened and precision ground to a form a cylindrical member having the desired dimensions for receiving the impeller 106. The impeller 106 includes a bushing 108 adjacent each end thereof for engaging the stationary shaft 104. Each of the bushings 108 is cylindrical in shape and dimensioned to closely fit the stationary shaft 104. The close fit of each of the bushings 108 over the shaft 104 may result in each of the bushings 108 being precision machined from a rigid material such as graphite.

The centrifugal pump 100 according to the prior art disadvantageously utilizes the interaction between two highly rigid materials in a manner promoting a generation and a transferal of NVH from the centrifugal pump to the passenger compartment of the electric vehicle. Additionally, the use of the precision machined stationary shaft 104 and the bushings 108 further increases the cost and the complexity of the manufacturing process of the centrifugal pump 100.

It would therefore be desirable to produce a centrifugal pump having a rotary assembly that minimizes NVH while remaining cost effective and easy to manufacture.

SUMMARY OF THE INVENTION

Compatible and attuned with the present invention, a cost effective and easy to manufacture rotary assembly of a centrifugal pump has surprisingly been discovered.

In one embodiment of the invention, a rotary assembly having a rotor and a static housing comprises a first opening formed in one of the rotor or the static housing, a first bushing disposed in the first opening, and a first shaft projection projecting axially from one of the rotor or the static housing. The first bushing extends annularly around a central opening thereof and is formed from an elastomeric material. The first shaft projection is received within the central opening of the first bushing. One of the first shaft projection or the first bushing rotates relative to the other of the first shaft projection or the first bushing during rotation of the rotor relative to the static housing.

In another embodiment of the invention, a centrifugal pump comprises a housing, an impeller, a first opening formed in one of the housing or the impeller, a first bushing disposed in the first opening, and a first shaft projection projecting axially from one of the housing or the impeller. The first bushing extends annularly around a central opening thereof and is formed from an elastomeric material. The first shaft projection is received within the central opening of the first bushing. One of the first shaft projection or the first bushing is configured to rotate relative to the other of the first shaft projection or the first bushing during operation of the centrifugal pump.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 2:
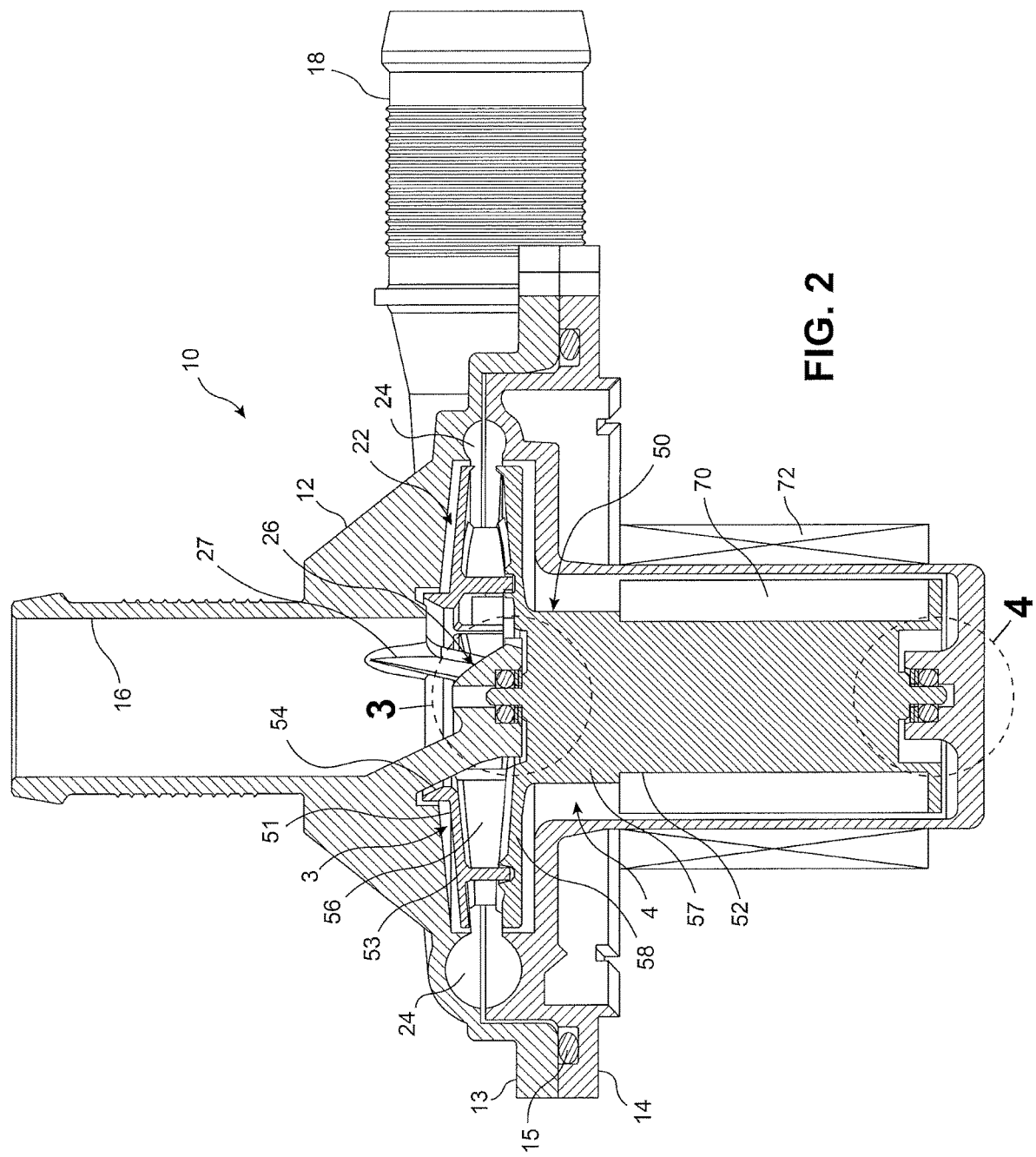
FIG. 2 is a cross-sectional view of a centrifugal pump having a rotary assembly according to an embodiment of the invention.

FIG. 2 illustrates a centrifugal pump 10 according to an embodiment of the present invention. The centrifugal pump 10 may be used for any application requiring transportation of a fluid through an associated system. The centrifugal pump 10 may be used for pumping a liquid coolant through a cooling system or a charging system of a motor vehicle, as a non-limiting example. However, one skilled in the art should appreciate that the centrifugal pump 10 may be used for any suitable application without departing from the scope of the present invention.

The centrifugal pump 10 includes a housing 12 defining a flow path through the centrifugal pump 10. The flow path formed by the housing 12 includes an inlet port 16, an impeller chamber 22, a volute 24, and an outlet port 18, wherein the flow path is passed by a fluid pumped in the order provided herein. An impeller 50 is rotatably coupled to the housing 12 and disposed within the impeller chamber 22, as explained in greater detail hereinafter.

The housing 12 may be formed from a first housing segment 13 cooperating with a second housing segment 14. In the embodiment shown in FIG. 2, the impeller chamber 22 and the volute 24 are substantially divided at a seam between the first housing segment 13 and the second housing segment 14, but alternative configurations may be used without departing from the scope of the present invention. A sealing element 15 such as an elastomeric O-ring may be disposed between the first housing segment 13 and the second housing segment 14 adjacent a periphery of the housing 12. The first housing segment 13 may be coupled to the second housing segment 14 by any known fasteners or couplings, including threaded fasteners (not shown). Alternatively, the first housing segment 13 may be coupled to the second housing segment 14 by an aggressive coupling method such as ultrasonic welding, as one non-limiting example. The sealing element 15 may be compressed between the first and second housing segments 13, 14 to form a fluid tight seal for preventing the escape of the fluid from an interior of the centrifugal pump 10 during operation thereof. However, alternative housing arrangements may be used without departing from the scope of the present invention, including housing arrangements having fewer or greater housing segments cooperating to form the flow path through the housing 12.

The inlet port 16 of the housing 12 extends in a first direction arranged parallel to a rotational axis of the impeller 30. A downstream end of the inlet port 16 forms an inlet into the impeller chamber 22. A baffle element 26 formed by a portion of the first housing segment 13 is disposed at the inlet into the impeller chamber 22. The baffle element 26 is coupled to the remainder of the first housing segment 13 by a plurality of spokes 27 extending radially between the baffle element 26 and an interior surface of the first housing segment 13 defining the inlet port 16 therein. The spokes 27 may be spaced from each other in a circumferential direction of the baffle element 26, as desired. A plurality of flow paths is formed between adjacent ones of the spokes 27 to provide fluid communication between the inlet port 16 and the impeller chamber 22.

The baffle element 26 may have a substantially conical shape, wherein the conical shape tapers inwardly as the baffle element 26 extends in the axial direction of the inlet port 16 towards the inlet end thereof. The baffle element 26 acts to divide the flow of the fluid through the inlet port 16 into a plurality of radially outwardly extending partial flows directed towards each of the flow paths formed between adjacent ones of the spokes 27. The conical shape of the baffle element 26 aids in preventing an undesirable pressure drop in the fluid when entering the impeller chamber 22 by preventing a sudden change in direction of the fluid as the fluid transitions from flowing axially along the inlet port 16 to flowing radially outwardly when entering the impeller chamber 22.

Figure 3:
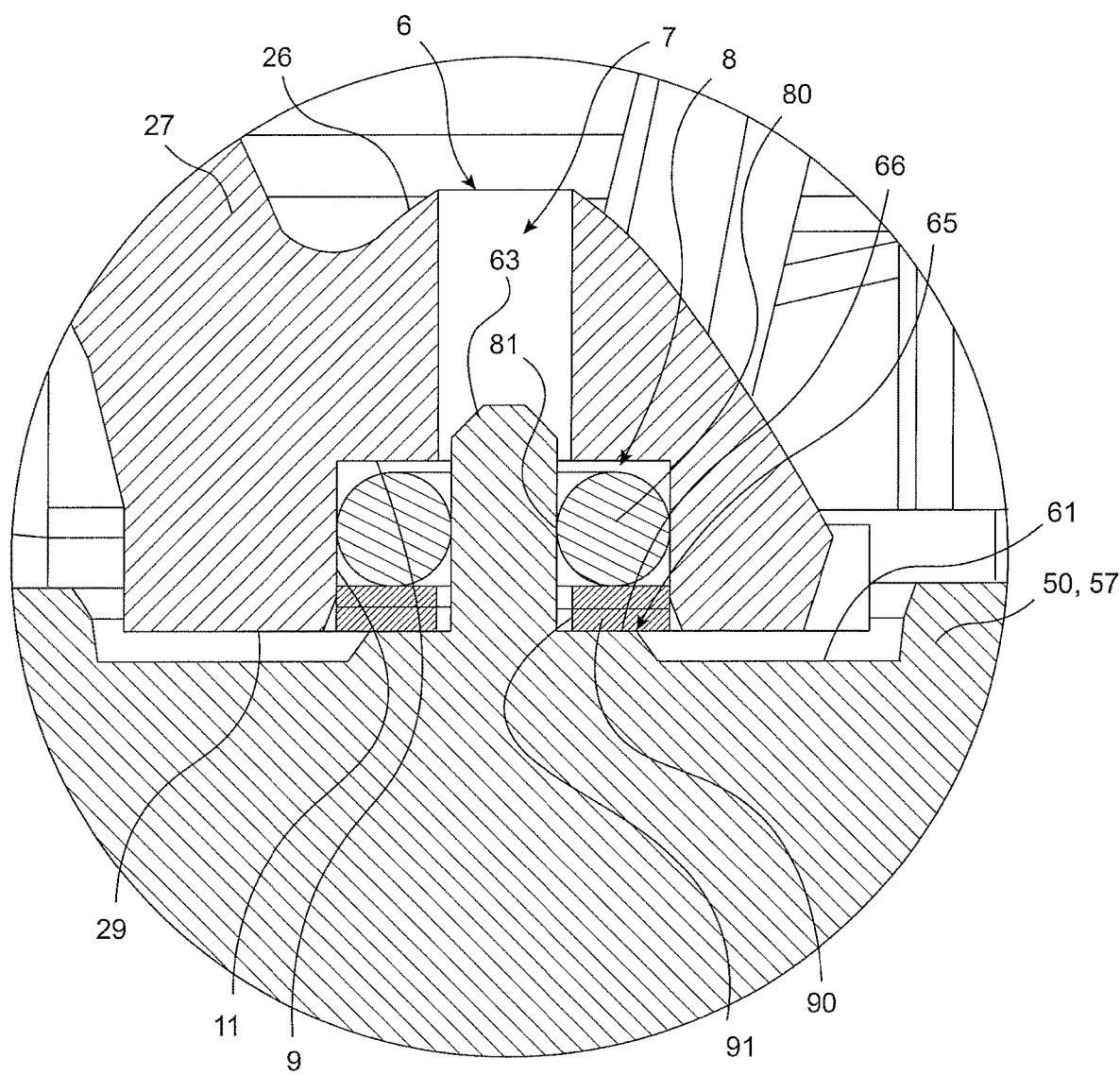
FIG. 3 is an enlarged fragmentary cross-sectional view of a portion of the centrifugal pump surrounded by circle 3 of FIG. 2.

As best shown in FIG. 3, the baffle element 26 includes a first opening 6 formed therethrough and extending in the axial direction of the inlet port 16. The first opening 6 includes a small diameter portion 7 and a large diameter portion 8, with the large diameter portion 8 forming a counterbore of the first opening 6. The large diameter portion 8 of the first opening 6 is cylindrical in shape and defined by a radially extending surface 9 and a perpendicularly arranged axially extending surface 11. The axially extending surface 11 intersects a radially extending surface 29 of the baffle element 26 opposite the conical surface thereof, wherein the radially extending surface 29 faces towards the impeller 50. The intersection of the axially extending surface 11 and the radially extending surface 9 may be beveled, as desired.

The impeller chamber 22 includes a first portion 3 and a second portion 4. The first portion 3 is substantially cylindrical in shape and extends radially outwardly from the baffle element 26 to surround the baffle element 26. The second portion 4 is substantially cylindrical in shape and is disposed in axial alignment with the inlet port 16 at a side of the baffle element 26 opposite the inlet port 16.

Figure 4:
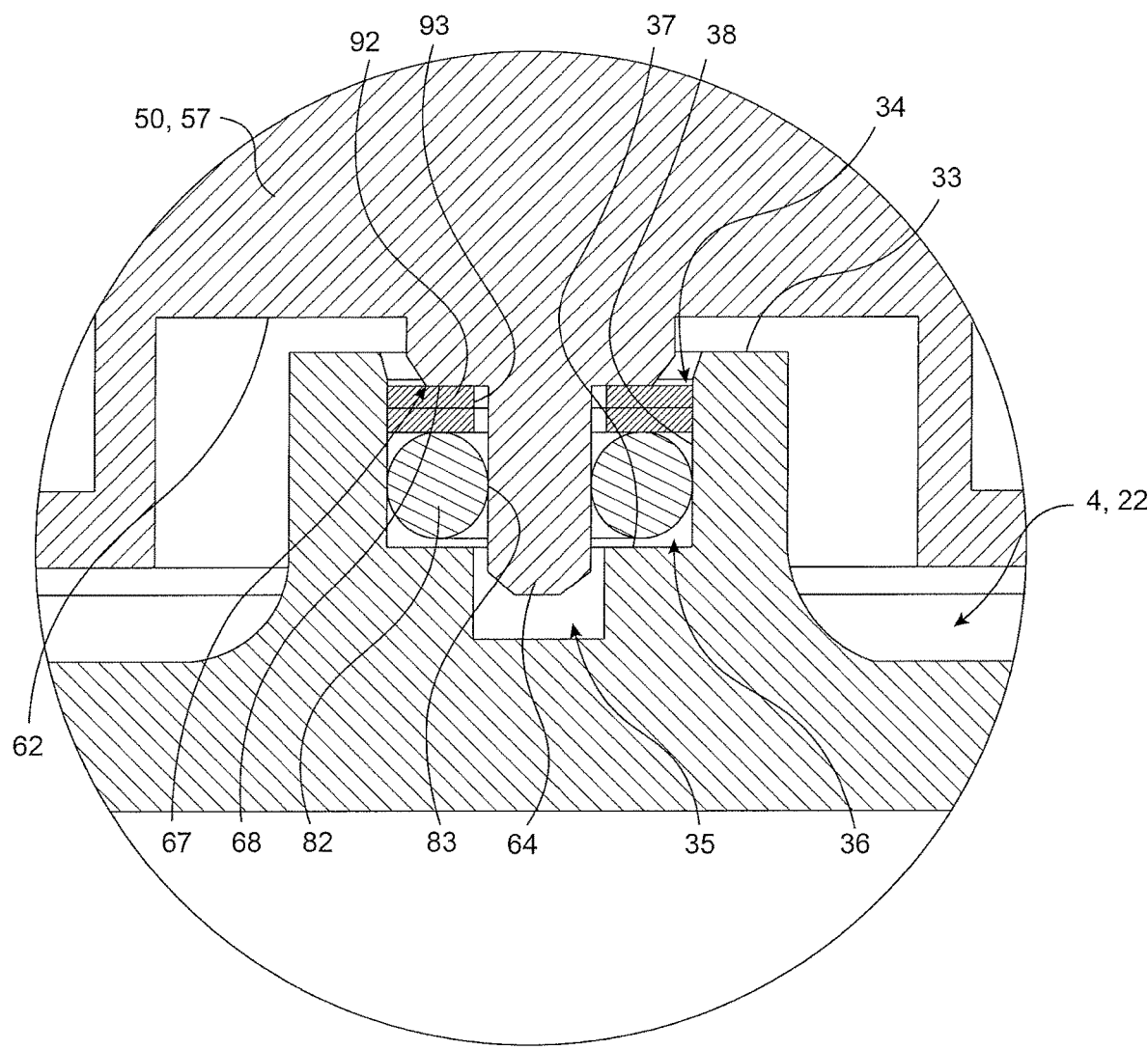
FIG. 4 is an enlarged fragmentary cross-sectional view of a portion of the centrifugal pump surrounded by circle 4 of FIG. 2.

As best shown in FIG. 4, an end of the second portion 4 of the impeller chamber 22 opposite the baffle element 26 includes an axially extending annular projection 33 surrounding the axis of rotation of the impeller 50. The annular projection 33 includes a cylindrical second opening 34 formed therein in axial alignment with the first opening 6 formed in the baffle element 26. The second opening 34 includes a small diameter portion 35 and a large diameter portion 36, with the large diameter portion 36 forming a counterbore of the second opening 34. The large diameter portion 36 is defined by a radially extending surface 37 intersecting the small diameter portion 35 and an axially extending surface 38 extending perpendicularly from the radially extending surface 37. The second opening 34 accordingly includes substantially similar structure as the first opening 6 arranged in an opposing direction thereto.

The volute 24 is disposed radially outwardly from the first portion 3 of the impeller chamber 22 and includes a continuously increasing flow area as the volute 24 extends from a minimized flow area at a position adjacent and lateral to the outlet port 18 to a maximized flow area at a position where the volute 24 transitions to the outlet port 18. The volute 24 is shown as having a substantially circular cross-sectional shape, but alternative cross-sectional shapes may be used without departing from the scope of the present invention. The outlet port 18 extends tangentially from the maximized flow area portion of the volute 24 in a second direction perpendicular to the axial direction of the inlet port 16.

The impeller 50 is shown in FIG. 2 as including a first impeller member 51 coupled to a second impeller member 52, but alternative configurations may be used without departing from the scope of the present invention. The first impeller member 51 may be considered a shroud of the impeller 50. The first impeller member 51 is disposed within the first portion 3 of the impeller chamber 22 and includes an annular first wall 53 extending at least partially in the radial direction of the centrifugal pump 10. The annular first wall 53 includes a central opening 54 forming an eye of the impeller 50, wherein the central opening 54 is disposed immediately downstream from the flow paths formed between adjacent ones of the spokes 27 at the inlet into the impeller chamber 22. A plurality of vanes 56 extend transversely from the first wall 53 and spiral radially outwardly away from the central opening 54 and towards the volute 24.

The second impeller member 52 includes a substantially T-shaped cross-section including a stem portion 57 extending between the first opening 6 and the second opening 34 and a second wall 58 extending radially outwardly from an end of the stem portion 57 adjacent the first opening 6. The second wall 58 extends radially and engages the first impeller member 51 to form a plurality of flow paths through the impeller 50 with each of the flow paths defined by the cooperation of the first wall 53, the second wall 58, and adjacent ones of the vanes 56. An inlet into each of the flow paths is formed at the central opening 54 of the first impeller member 51. An outlet of each of the flows paths is formed where each pair of the adjacent vanes 56 terminate at the boundary into the volute 24 formed around the first portion 3 of the impeller chamber 22.

In alternative embodiments, the impeller 50 may be provided in the absence of the first impeller member 51 to form a shroudless impeller 50. In such an instance, the vanes 56 may extend exclusively from the second impeller member 52 while a portion of the first housing segment 13 partially defines a flow path for the fluid passing radially outwardly when encountering the vanes 56. However, it should be understood that any configuration for the impeller 50 suitable for forming one of the rotary assemblies as disclosed herein may be used without necessarily departing from the scope of the present invention. The vanes 56 may also have any suitable shape or configuration as the vanes 56 extend radially outwardly from the central region of the impeller 50.

As best shown in FIGS. 3 and 4, a first end face 61 of the stem portion 57 includes a first shaft projection 63 extending axially therefrom while a second end face 62 of the stem portion 57 includes a second shaft projection 64 extending axially therefrom. The first shaft projection 63 is in axial alignment with the second shaft projection 64, wherein the first and second shaft projections 63, 64 are aligned along the axis of rotation of the impeller 50. A first shoulder 65 surrounds a base of the first shaft projection 63. The first shoulder 65 includes a radially extending surface 66 facing towards the first opening 6. A remainder of the first end face 61 surrounding the first shoulder 65 is spaced from the radially extending surface 66 to provide a clearance between an underside of the baffle element 26 and the stem portion 57 of the impeller 50. Similarly, a second shoulder 67 surrounds a base of the second shaft projection 64. The second shoulder 67 includes a radially extending surface 68 facing towards the second opening 34. A remainder of the second end face 62 is spaced from the radially extending surface 68 to form a clearance between the annular projection 33 and the stem portion 57 of the impeller 50.

The impeller 50 may be formed from a rigid material, and more specifically, a rigid material capable of being molded to include the features disclosed in FIGS. 2-4. The moldable rigid material may be a polymeric material such as a plastic. The plastic may be a thermoplastic or a thermosetting polymer, as desired. The material forming the impeller 50 may be selected to include a substantially smooth outer surface upon a hardening of the moldable material for minimizing the frictional forces generated between the impeller 50 and any engaging components. The second impeller member 52, and more specifically the stem portion 57 of the impeller 50 having the first shaft projection 63 and second shaft projection 64, may be formed in a single manufacturing process such as the aforementioned molding process. The molding process may form a single integral structure having the first and second shaft projections 63, 64 projecting from the stem portion 57. The molding of the impeller 50 allows for the outer diameter of each of the first shaft projection 63 and the second shaft projection 64 to be determined by the molding process to within desired tolerances.

Referring back to FIG. 2, the impeller 50 further includes a first electromagnetic component 70 disposed on or adjacent an outer circumferential surface of the stem portion 57. The first electromagnetic component 70 may be one or more permanent magnets disposed circumferentially about the stem portion 57 of the impeller 50. A second electromagnetic component 72 (shown schematically) is disposed annularly about an exterior of the second housing segment 14 and surrounding the first electromagnetic component 70. The second electromagnetic component 72 may be a selectively energized electrical element configured to generate an electromagnetic field suitable for causing a rotation of the impeller 50 via an interaction between the first and second electromagnetic components 70, 72. The second electromagnetic component 72 may be disposed within a motor housing (not shown) configured for engagement with and coupling to an underside of the second housing segment 14 to position the second electromagnetic component 72 adjacent the first electromagnetic component 70.

As best shown in FIG. 3, a first bushing 80 and at least one friction washer 90 are disposed within the first opening 6 between the housing 12 and the impeller 50. The first bushing 80 may include a substantially circular or elliptical cross-sectional shape, but alternative cross-sectional shapes may be used without departing from the scope of the present invention. The first bushing 80 may be an O-ring, as one non-limiting example. The first bushing 80 may alternatively be molded to include a cross-sectional shape substantially conforming to a shape of the large diameter portion 8 of the first opening 6, as desired. The first bushing 80 may for example have a substantially rectangular cross-sectional shape, a substantially trapezoidal cross-sectional shape, a substantially triangular cross-sectional shape, a substantially semi-circular cross-sectional shape, or any cross-sectional shape including combinations of the aforementioned shapes.

The first bushing 80 includes a circular shaped central opening 81 configured to receive the first shaft projection 63 therein. If a cross-sectional shape other than a circular or elliptical shape is used, it may be preferable to include a minimized height of an innermost portion of the first bushing 80 defining the central opening 81 thereof to avoid excessive frictional contact between the first bushing 80 and the first shaft projection 63. The first shaft projection 63 may extend at least partially into the small diameter portion 7 of the first opening 6 when the first shaft projection 63 is fully received in the first bushing 80.

The first bushing 80 may be formed from a resilient and elastically deformable material. More specifically, the first bushing 80 may be formed from a polymeric material such as an elastomer (rubber). The elastomer may be a synthetic rubber such as ethylene propylene diene monomer rubber (EPDM), as one non-limiting example. The elastomeric material may be selected to include a desired degree of elasticity, strength, abrasion resistance, and chemical compatibility, as non-limiting factors.

The centrifugal pump 10 shown in FIGS. 2 and 3 includes a pair of the friction washers 90, but fewer or greater friction washers 90 may be used, as desired. Each of the friction washers 90 extends annularly and has a substantially rectangular cross-sectional shape. A central opening 91 formed through each of the friction washers 90 may have an inner diameter slightly larger than an outer diameter of the first shaft projection 63 to prevent continuous engagement between an outer surface of the first shaft projection 63 and an inner surface of each of the friction washers 90, thereby reducing potential frictional contact therebetween. Each of the friction washers 90 may be formed from a solid and rigid material, such as a metallic material. The friction washers 90 may be formed from stainless steel or another steel alloy, as desired. However, any rigid material having suitable wear resistance may be used to form each of the friction washers 90.

As best shown in FIG. 4, a second bushing 82 and at least one friction washer 92 are disposed within the second opening 34 between the housing 12 and the impeller 50. The second bushing 82 may include a substantially circular or elliptical cross-sectional shape, but alternative cross-sectional shapes may be used without departing from the scope of the present invention. The second bushing 82 may be an O-ring, as one non-limiting example. The second bushing 82 includes a circular shaped central opening 83 receiving the second shaft projection 64 therein. The second shaft projection 64 may extend at least partially into the small diameter portion 35 of the second opening 34 when the second shaft projection 64 is fully received in the second bushing 82. The second bushing 82 may be formed from a resilient and elastically deformable material. More specifically, the second bushing 82 may be formed from a polymeric material such as an elastomer (rubber). The elastomer may be a synthetic rubber such as ethylene propylene diene monomer rubber (EPDM), as one non-limiting example. The second bushing 82 may accordingly be substantially identical to the first bushing 80 and may include each of the features described hereinabove with reference to the first bushing 80.

The centrifugal pump 10 shown in FIGS. 2 and 4 includes a pair of the friction washers 92, but fewer or greater friction washers 92 may be used, as desired. Each of the friction washers 92 extends annularly and has a substantially rectangular cross-sectional shape. A central opening 93 formed through each of the friction washers 92 may have an inner diameter slightly larger than an outer diameter of the second shaft projection 64 to prevent engagement between an outer surface of the second shaft projection 64 and an inner surface of each of the friction washers 92, thereby reducing frictional contact therebetween. Each of the friction washers 92 may be formed from a solid and rigid material, such as a metallic material. The friction washers 92 may be formed from stainless steel or another steel alloy, as desired. However, any rigid material having suitable wear resistance may be used to form each of the friction washers 92.

As shown in FIG. 3, the first bushing 80 engages each of an outer circumferential surface of the first shaft projection 63 and the axially extending surface 11 of the large diameter portion 8 of the first opening 6. The first bushing 81, the first shaft projection 63, and the large diameter portion 8 of the first opening 6 may be dimensioned relative to each other such that the first bushing 80 is compressed in the radial direction when the first bushing 80 is received over the first shaft projection 63 and received within the large diameter portion 8 of the first opening 6.

Accordingly, a distance measured in the radial direction between the outer circumferential surface of the first shaft projection 63 and the axially extending surface 11 of the large diameter portion 8 is selected to be smaller than a difference between an inner diameter and an outer diameter of the first bushing 80 when not compressed between the first shaft projection 63 and the axially extending surface 11. The components may be dimensioned such that the radial dimension of the first bushing 80 is reduced by about 20% when compressed between the first shaft projection 63 and the axially extending surface 11, but alternative degrees of compression may be used without departing from the scope of the present invention. The degree of compression of the first bushing 80 is selected to maintain continuous contact between the first shaft projection 63 and the first bushing 80 without providing excessive frictional forces therebetween.

The compressive fit of the first bushing 80 between the first shaft projection 63 and the axially extending surface 11 may include the central opening 81 having an inner diameter that is substantially equal to an outer diameter of the first shaft projection 63 while an outer diameter of the first bushing 80 may be larger than an inner diameter of the large diameter portion 8 of the first opening 6. Alternatively, the compressive fit may include the first bushing 80 having an outer diameter that is substantially the same as the inner diameter of the large diameter portion 8 while the central opening 81 has an inner diameter that is smaller than the outer diameter of the first shaft projection 63. Still, in other embodiments, the outer diameter of the first bushing 80 may be greater than the inner diameter of the large diameter portion 8 while the central opening 81 may have a smaller inner diameter than the outer diameter of the first shaft projection 63. Any such fit may be used without departing from the scope of the present invention so long as the first bushing 80 maintains the compressed state between the axially extending surface 11 and the first shaft projection 63 during rotation of the impeller 50.

As shown in FIG. 4, the second bushing 82 is similarly compressed between an outer circumferential surface of the second shaft projection 64 and the axially extending surface 38 of the second opening 34 to maintain continuous contact therebetween without introducing excessive frictional forces therebetween. An outer diameter of the second bushing 82, an inner diameter of the central opening 83, an inner diameter of the large diameter portion 36 of the second opening 34, and an outer diameter of the second shaft projection 64 may all be selected to provide one of the compressive fits described above with reference to the first bushing 80. The second bushing 82 is preferably compressed to the same extent and in the same manner as the first bushing 80 to promote substantially equal frictional forces at each end of the impeller 50 to avoid an undesired imbalance in the rotation of the impeller 50.

The first bushing 80 and the second bushing 82 may be selected to include the same dimensions as each other, including the same outer diameter, the same inner diameter, and the same cross-sectional thickness (when in an uncompressed state). The listed dimensions may be selected based on a given application for the centrifugal pump 10, such as achieving a desired angular velocity of the pump or achieving a desired pumping capacity of the pump, as non-limiting examples.

As shown in FIG. 3, an axial dimension of the large diameter portion 8 of the first opening 6 is greater than a combined length of an axial dimension of the friction washers 90 and an axial dimension of the first bushing 80 when in the compressed state between the first shaft projection 63 and the axially extending surface 11. This configuration maintains the presence of a small clearance at some point between the radially extending surface 9 of the large diameter portion 8 and the radially extending surface 66 of the first shoulder 65 surrounding the first shaft projection 63. This small clearance ensures that the first bushing 80 is not compressed in the axial direction due to occasional contact between the first shoulder 65 and one of the friction washers 90. Such axial compression of the first bushing 80 would result in additional frictional forces present between the first shoulder 65 and the friction washers 90 due to the pressing of the first bushing 80 on the friction washers 90 in the axial direction, thereby increasing the power necessary to rotate the impeller 50 at a desired rotational speed while also increasing the amount of wear experienced at the interaction between the shoulder 65 and the one of the friction washers 90. The clearance is shown in FIG. 3 as being present immediately between the first bushing 80 and the radially extending surface 9, but it is understood that the clearance may be present at any point between the radially extending surface 9 and the radially extending surface 66 of the shoulder 65 without departing from the scope of the present invention. Furthermore, the clearance may also vary in its location between the shoulder 65 and the radially extending surface 9 during operation of the centrifugal pump 10 due to slight drift in the axial direction of one or more of the first bushing 80, the friction washers 90, or the impeller 50.

Referring again to FIG. 4, a small axial clearance is similarly present intermediate the radially extending surface 68 of the second shoulder 67 and the radially extending surface 37 of the large diameter portion 36 of the second opening 34 to ensure that the second bushing 82 is also not compressed in the axial direction thereof. The small clearance may similarly migrate to be present between different components within the second opening 34 due to drift thereof during operation of the centrifugal pump 10, as described above.

In use, the second electromagnetic component 72 is electrically energized to form an electromagnetic field suitable for rotating the impeller 50 about the axis of rotation thereof via interaction with the first electromagnetic component 70 coupled to the stem portion 57 of the impeller 50. A fluid flowing axially through the inlet port 16 encounters the baffle element 26 and is divided into the flow paths formed between adjacent ones of the spokes 27. The fluid enters the impeller 50 through the central opening 54 and is forced radially outwardly toward the volute 24 due to the rotary motion of the vanes 56 during rotation of the impeller 50. The fluid then enters the volute 24 and flows circumferentially thereabout before being ejected tangentially from the centrifugal pump 10 through the outlet port 18.

During rotation of the impeller 50, the first bushing 80 is maintained in a compressed state in the radial direction between the first shaft projection 63 and the axially extending surface 11 of the large diameter portion 8 of the first opening 6 while the second bushing 82 is maintained in the compressed state in the radial direction between the second shaft projection 64 and the axially extending surface 38 of the large diameter portion 36 of the second opening 34. The maintaining of the compressed state of each of the elastomeric bushings 80, 82 results in continuous contact between each of the elastomeric bushings 80, 82 and each of the corresponding shaft projections 63, 64 to avoid the formation of vibrations due to relative movement between the two components. In other words, the shaft projections 63, 64 do not repeatedly strike one of the bushings 80, 82 during rotation of the impeller 50 due to a variable spacing present therebetween and in a manner generating additional vibrations that can be detected by a passenger of the vehicle.

The formation of each of the bushings 80, 82 from an elastomeric material also allows for each of the bushings 80, 82 to act as a dampening mechanism for dampening any vibrations carried through one of the bushings 80, 82. The bushings 80, 82 accordingly prevent the transferal of vibration from the impeller 50 to the housing 12 or from the housing 12 to the impeller 50. For example, any vibrations generated by the rotation of the impeller 50 while pumping the fluid may be dampened by each of the bushings 80, 82 to prevent the vibrations from being transferred to the housing 12 of the centrifugal pump 10 and subsequently the passenger compartment of the vehicle. Generally speaking, as a softness of the elastomeric material forming the bushings 80, 82 is increased, a dampening effect of the bushings 80, 82 is similarly increased, hence the elastomeric material may be selected to have a desired degree of vibration dampening properties suitable for the given application. It is accordingly beneficial for the bushings 80, 82 to form the only components in continuous contact with each of the impeller 50 and the housing 12 to ensure that no other component associated with the rotary assembly is capable of carrying vibrations between the housing 12 and the impeller 50. The rotary sliding contact is accordingly limited to the interaction between the impeller 50 and each of the bushings 80, 82 during rotation of the impeller 50.

The use of an elastomeric O-ring to form each of the bushings 80, 82 provides numerous benefits over a traditional cylindrical and rigid bushing. The use of a circular or elliptical cross-sectional shape allows for a relatively small portion of each of the bushings 80, 82 to engage the corresponding shaft projection 63, 64, thereby reducing the frictional forces present between each of the bushings 80, 82 and each of the corresponding shaft projections 63, 64. The circular or elliptical cross-sectional shape further ensures that each of the bushings 80, 82 is devoid of a shape having sharp edges or the like that could promote degradation of the bushings 80, 82 during use thereof. Lastly, elastomeric O-rings are relatively cheap and easy to manufacture due to the wide commercial availability of such O-rings.

Figure 1:
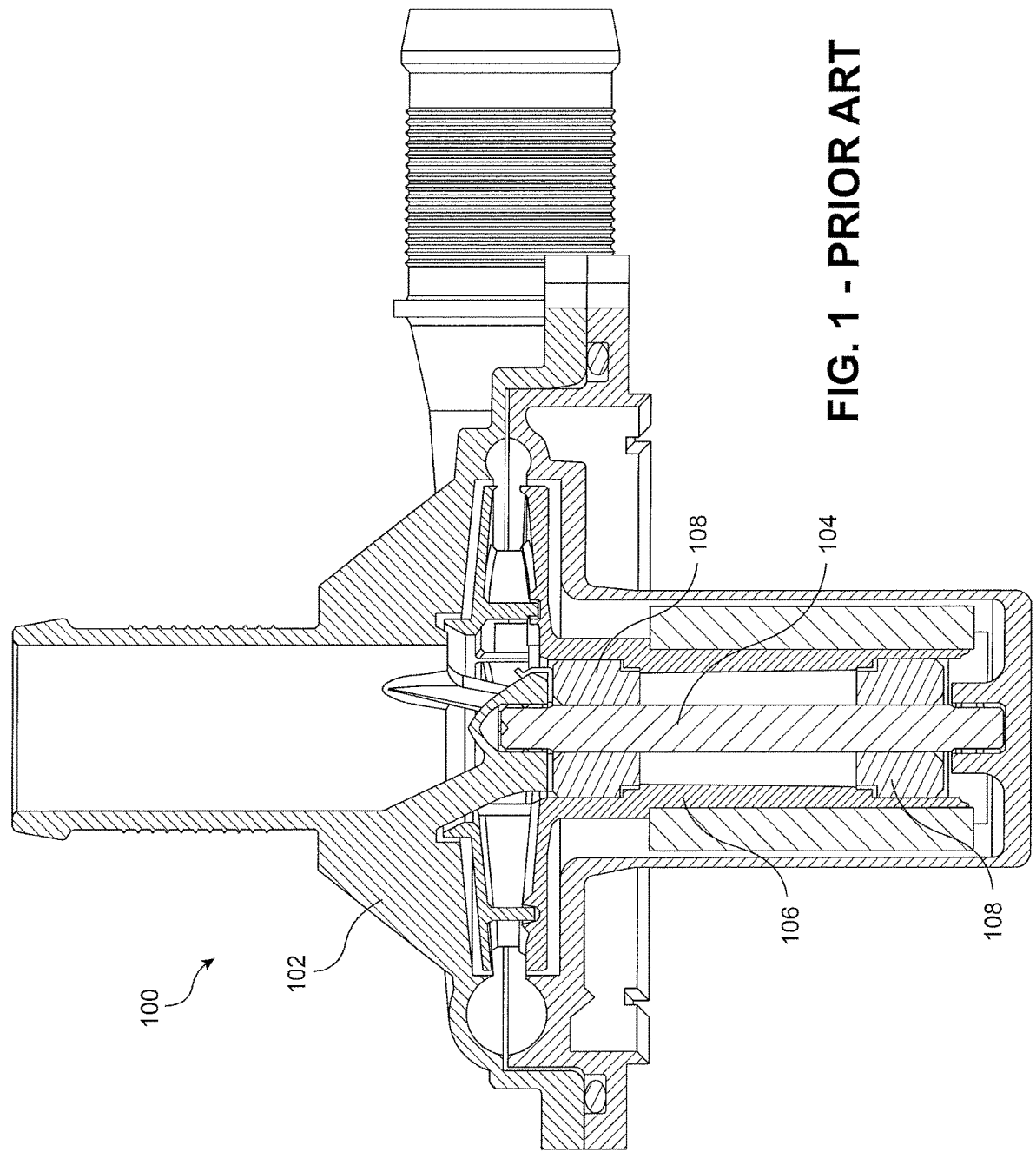
FIG. 1 is a cross-sectional view of a centrifugal pump having a rotary assembly according to the prior art.

The formation of the impeller 50 from a moldable material such as a suitable plastic allows for the impeller 50 to be formed more cost effectively than an impeller requiring a precision machined component such as the bushings 108 and the stationary shaft 104 of the prior art centrifugal pump 100 disclosed in FIG. 1. The manner in which each of the bushings 80, 82 is compressed in the radial direction thereof also allows for the tolerances used in manufacturing the openings 6, 34, the bushings 80, 82, and the shaft projections 63, 64 to be relaxed in comparison to the precision machined components. The disclosed configuration also beneficially allows for the shaft projections 63, 64 to be formed integrally as part of a single monolithic body including the stem portion 57 of the impeller 50 in order to simplify the manufacturing of the centrifugal pump 10 by reducing a number of components forming the rotary assembly of the centrifugal pump 10.

The first and second shaft projections 63, 64 are also formed to have a relatively smaller outer diameter in comparison to the stationary shaft 104 of the centrifugal pump 100 according to the prior art. The reduction in the diameter of each of the shaft projections 63, 64 results in the engagement between each of the shaft projections 63, 64 and each of the corresponding bushings 80, 82 occurring at a smaller distance from the axis of rotation of the impeller 50 than is the case with respect to the stationary shaft 104 of the prior art. This smaller distance results in a relative tangential velocity present between the outer surface of each of the shaft projections 63, 64 and each of the corresponding bushings 80, 82 being less than is present between the stationary shaft 104 and each of the bushings 108 of the prior art for a given angular velocity of the impeller 50. This reduction in velocity further reduces the generation of NVH at the interaction between each of the shaft projections 63, 64 and each of the corresponding bushings 80, 82.

Figure 5:
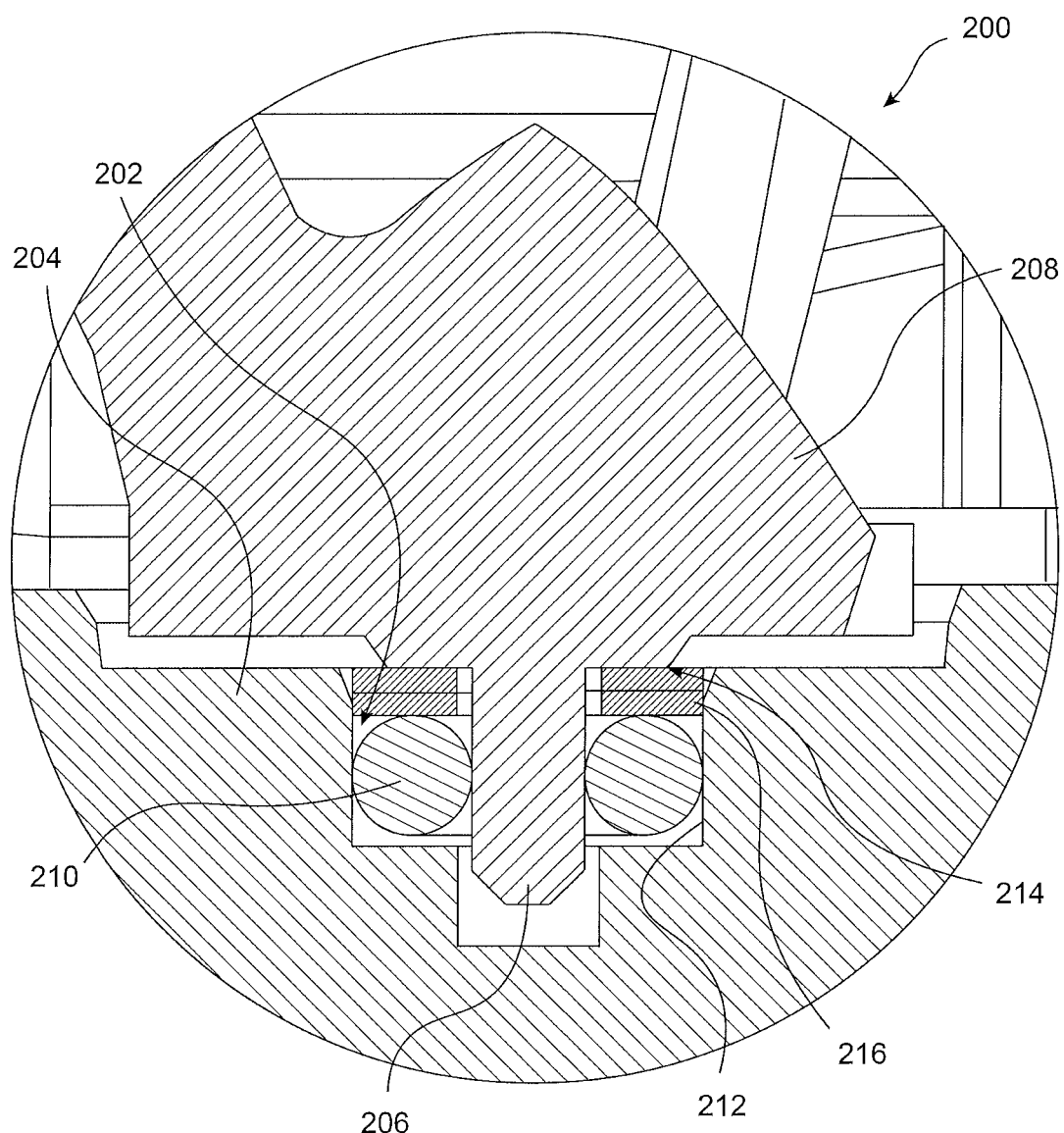
FIG. 5 is an enlarged fragmentary cross-sectional view of a rotary assembly according to another embodiment of the present invention.

It should be understood by one skilled in the art that the rotary assembly disclosed in FIGS. 2-4 may be formed in a reverse configuration without necessarily departing from the scope of the present invention. For example, FIG. 5 illustrates an exemplary configuration of a portion of a centrifugal pump 200 according to another embodiment of the invention wherein a cylindrical opening 202 is formed in an end face of an impeller 204 while a shaft projection 206 extends axially from a housing 208 of the centrifugal pump 200. An elastomeric bushing 210 is received over the shaft projection 206 and is compressed between the shaft projection 206 and an axially extending surface 212 defining a portion of the opening 202. At least one friction washer 214 is disposed between the elastomeric bushing 210 and a shoulder 216 surrounding the shaft projection 206. The same configuration including the reversal of the components may be present at an opposite end of the impeller 204 than that illustrated in FIG. 5, as desired.

The rotary assembly of the centrifugal pump 200 accordingly includes a shaft projection extending from a static housing of the rotary assembly (the housing 208) while a rotor of the rotary assembly (the impeller 204) includes an opening for housing a bushing therein. This arrangement is contrary to that of FIGS. 2-4, which includes a shaft projection extending from a rotor of the rotary assembly (the impeller 50) while a static housing of the rotary assembly (the housing 12) having a stator (the second electrical component 72) includes an opening for housing a bushing therein. It should accordingly be understood that the disclosed rotary assembly having a shaft projection extending from one of a rotor or a static housing, an elastomeric bushing rotatably receiving the shaft projection, and an opening formed in one of the rotor or the static housing may be adapted for any variety of different rotary applications requiring rotation of a rotor relative to a static housing having a stator.

Figure 6:
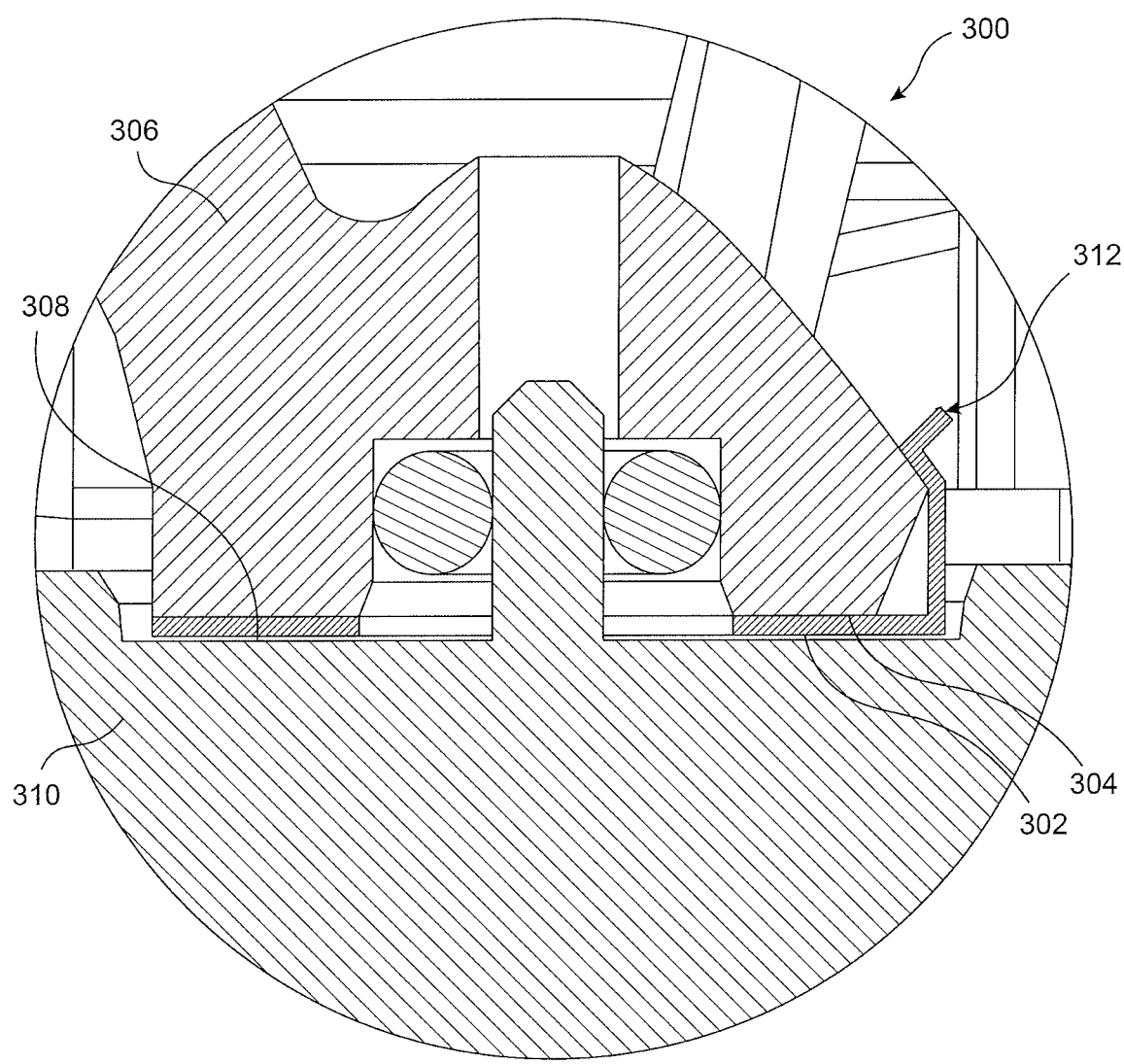
FIG. 6 is an enlarged fragmentary cross-sectional view of a rotary assembly according to yet another embodiment of the present invention.

FIG. 6 illustrates a centrifugal pump 300 having an alternative wear resistant structure in place of the friction washers 90, 92 of FIGS. 2-4. The centrifugal pump 300 includes a substantially annular wear plate 302 disposed on an annularly and radially extending surface 304 of a housing 306 of the centrifugal pump 300, wherein the surface 304 is in facing relationship with an end face 308 of an impeller 310. The wear plate 302 may include a retaining feature 312 extending transversely from a periphery thereof and configured to provide a snap-fit connection of the wear plate 302 to a portion of the housing 306. The wear plate 302 may be formed from the same materials described herein with reference to the friction washers 90, 92. A slight clearance may normally be present between the wear plate 302 and the end face 308 of the impeller 310 to prevent excessive frictional forces therebetween during operation of the centrifugal pump 300.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A rotary assembly having a rotor and a static housing, the rotary assembly comprising:
    a first bushing disposed in a first opening formed in one of the rotor or the static housing, the first bushing extending annularly around a central opening thereof and formed from an elastomeric material; and
    a first shaft projection projecting axially from one of the rotor or the static housing, the first shaft projection received within the central opening of the first bushing, wherein one of the first shaft projection or the first bushing rotates relative to an other of the first shaft projection or the first bushing during rotation of the rotor relative to the static housing, wherein the first opening includes a small diameter portion and an adjacent large diameter portion, the small diameter portion receiving at least a portion of the first shaft projection therein and the large diameter portion receiving the first bushing therein, wherein the first shaft projection passes through the central opening of the first bushing, and wherein the first bushing is compressed in a radial direction thereof between the first shaft projection and an axially extending surface defining a portion of the large diameter portion of the first opening.

2. The rotary assembly of claim 1, wherein the first bushing has one of a circular or an elliptical cross-sectional shape.

3. The rotary assembly of claim 1, wherein the elastomeric material forming the first bushing is a synthetic rubber.

4. The rotary assembly of claim 3, wherein the synthetic rubber is ethylene propylene diene monomer (EPDM) rubber.

5. The rotary assembly of claim 1, wherein the first shaft projection is formed from a plastic material.

6. The rotary assembly of claim 1, wherein at least one annularly extending washer is disposed between the first bushing and a radially extending surface of one of the rotor or the static housing, the radially extending surface formed at a base of the first shaft projection the at least one annularly extending washer disposed within the first opening.

7. The rotary assembly of claim 1, further comprising:
    a second bushing disposed in a second opening formed in one of the rotor or the static housing, the second bushing extending annularly around a central opening thereof and formed from an elastomeric material; and
    a second shaft projection projecting axially from one of the rotor or the static housing, the second shaft projection received within the second bushing.

8. The rotary assembly of claim 7, wherein the rotor includes the first shaft projection and the second shaft projection projecting axially from opposite ends thereof, the first shaft projection and the second shaft projection formed integrally with at least a portion of the rotor.

9. A centrifugal pump comprising:
    a housing;
    an impeller;
    a first bushing disposed in a first opening formed in one of the housing or the impeller, the first bushing extending annularly around a central opening thereof and formed from an elastomeric material; and
    a first shaft projection projecting axially from one of the housing or the impeller, the first shaft projection received within the central opening of the first bushing, wherein one of the first shaft projection or the first bushing is configured to rotate relative to an other of the first shaft projection or the first bushing, wherein the first opening includes a small diameter portion and an adjacent large diameter portion, the small diameter portion receiving at least a portion of the first shaft projection therein and the large diameter portion receiving the first bushing therein, wherein the first shaft projection passes through the central opening of the first bushing, wherein the first bushing is compressed in a radial direction thereof between the first shaft projection and an axially extending surface defining a portion of the large diameter portion of the first opening.

10. The centrifugal pump of claim 9, wherein the first bushing has one of a circular or an elliptical cross-sectional shape.

11. The centrifugal pump of claim 9, wherein a radial dimension of the first bushing is reduced by about 20% when the first bushing is compressed between the axially extending surface and the first shaft projection.

12. The rotary assembly of claim 9, wherein the elastomeric material forming the first bushing is a synthetic rubber.

13. The rotary assembly of claim 12, wherein the synthetic rubber is ethylene propylene diene monomer (EPDM) rubber.

14. The rotary assembly of claim 9, wherein the first shaft projection is formed from a plastic material.

15. The centrifugal pump of claim 9, wherein at least one annularly extending washer is disposed between the first bushing and a radially extending surface of one of the housing or the impeller, the radially extending surface formed at a base of the first shaft projection, the at least one annularly extending washer disposed within the first opening.

16. The centrifugal pump of claim 9, further comprising:
a second bushing disposed in a second opening formed in one of the housing or the impeller, the second bushing formed from an elastomeric material; and
a second shaft projection projecting axially from one of the housing or the impeller, the second shaft projection received within the second bushing.

17. The centrifugal pump of claim 16, wherein the impeller includes the first shaft projection and the second shaft projection projecting axially from opposite ends thereof, the first shaft projection and the second shaft projection formed integrally with at least a portion of the impeller.

* * * * *